US012463315B2

(12) United States Patent
Haines et al.

(10) Patent No.: US 12,463,315 B2

(45) Date of Patent: Nov. 4, 2025

(54) TELECOMMUNICATIONS EQUIPMENT MOUNTING PIPE FOR A MONOPOLE PLATFORM ASSEMBLY AND RELATED PLATFORM ASSEMBLIES

(71) Applicant: Outdoor Wireless Networks LLC, Claremont, NC (US)

(72) Inventors: Jared D. Haines, Rock City Falls, NY (US); Michael J. Paulus, Dallas, TX (US); Samantha L. Merta, Plano, TX (US); Jason G. Seeley, Fort Worth, NC (US); Randy Eugene Rogers, Jr., Fort Worth, TX (US)

(73) Assignee: OUTDOOR WIRELESS NETWORKS LLC, Richardson, TX (US)

(*) Notice: Subject to any disclaimer, the term of this patent is extended or adjusted under 35 U.S.C. 154(b) by 64 days.

(21) Appl. No.: 18/630,006

(22) Filed: Apr. 9, 2024

(65) Prior Publication Data

US 2024/0363992 A1 Oct. 31, 2024

Related U.S. Application Data

(60) Provisional application No. 63/498,099, filed on Apr. 25, 2023.

(51) Int. Cl.

| | |
|---|---|
| ***H01Q 1/12*** | (2006.01) |
| ***H01Q 1/24*** | (2006.01) |
| ***H01Q 9/30*** | (2006.01) |

(52) U.S. Cl.

CPC ........... *H01Q 1/1242* (2013.01); *H01Q 1/246* (2013.01); *H01Q 9/30* (2013.01)

(58) Field of Classification Search

None

See application file for complete search history.

(56) References Cited

U.S. PATENT DOCUMENTS

| | | | | |
|---|---|---|---|---|
| 9,991,607 | B1 * | 6/2018 | West | H01Q 13/0275 |
| 2003/0184490 | A1 * | 10/2003 | Raiman | H01Q 1/246<br>343/890 |
| 2015/0013261 | A1 * | 1/2015 | Kolokotronis | B23P 15/00<br>52/651.07 |
| 2021/0336331 | A1 * | 10/2021 | Rai | H01Q 1/42 |
| 2022/0052433 | A1 * | 2/2022 | Klein | H01Q 1/1228 |

* cited by examiner

*Primary Examiner* — Crystal L Hammond

(74) *Attorney, Agent, or Firm* — MYERS BIGEL, P.A.

(57) ABSTRACT

The present disclosure describes a mounting pipe assembly. The mounting pipe assembly including an active antenna unit having an antenna and a radio mounted behind the antenna, and a radially offset mounting pipe. The mounting pipe having a first linear segment radially offset from a second linear segment by a transition segment and is configured to mirror a rear profile of the active antenna units. The active antenna unit is mounted to the radially offset mounting pipe via a plurality of mounting brackets. Related platform assemblies are also described herein.

20 Claims, 9 Drawing Sheets

TELECOMMUNICATIONS EQUIPMENT MOUNTING PIPE FOR A MONOPOLE PLATFORM ASSEMBLY AND RELATED PLATFORM ASSEMBLIES

RELATED APPLICATION(S)

The present application claims priority to and the benefit of U.S. Provisional Patent Application Ser. No. 63/498,099, filed Apr. 25, 2023, the disclosure of which is hereby incorporated herein by reference in its entirety.

FIELD

The present application is directed generally toward telecommunications equipment, and more particularly, a mounting pipe for a monopole platform assembly and related platform assemblies.

BACKGROUND

Current sector frames and monopole antenna platforms utilize mounting poles or pipes to secure passive and active antennas thereto. An exemplary antenna platform illustrated in FIGS. 1A-1B. As shown in FIGS. 1A-1C, the platform assembly 10 utilizes mounting poles 14 (FIG. 1C) having a straight or linear profile to mount active antenna units 40 and passive antennas 50 to one or more of the horizontal members or pipes 12 of the platform assembly 25. Many active antenna units 40 comprise an antenna 42 and a radio 44 integrated as a single unit. As shown in FIGS. 1A-1B, when the active antenna units 40 and passive antennas 50 are mounted to the same horizontal members 12, since the radio 44 is mounted behind the antenna 42, the front surfaces of the antennas 42 of the active antenna units 40 reside along a first plane P1 that is a distance D1 from a second plane P2 on which the front surface of the passive antenna 50 resides. In some instances, the separation of the first and second planes P1, P2 can create interference of the radio frequency (RF) signals sent from or received by the active antenna units 40 and the passive antennas 50. There may be a desire for alternative ways to mount the active antenna units to a monopole platform assembly.

SUMMARY

A first aspect of the present invention is directed to a monopole platform assembly. The monopole platform assembly includes a ring mount configured to be secured to a monopole, a plurality of platform subassemblies, and a plurality of vertical mounting members. Each platform subassembly is coupled to the ring mount via a support member and includes upper and lower auxiliary support members and a grating. Adjacent platform subassemblies are coupled together via horizontal members extending between and secured to respective upper and lower auxiliary support members. Each vertical mounting member is configured to be mounted to at least one of the horizontal members, with one or more of the vertical mounting members having a first linear segment radially offset from a second linear segment by a transition segment to form a radially offset mounting member and one or more of the vertical mounting members having a linear profile. Each radially offset mounting member is configured to have an active antenna unit mounted thereto, the active antenna unit including an antenna and a radio mounted behind the antenna, and each vertical mounting member having the linear profile is configured to have a passive antenna mounted thereto.

Another aspect of the present invention is directed to a monopole platform assembly. The monopole platform assembly includes a monopole, a ring mount secured to the monopole, and three platform subassemblies. Each platform subassembly is coupled to the ring mount via a support member, and adjacent platform subassemblies are coupled together via one or more horizontal members extending therebetween. The monopole platform assembly further includes a plurality of vertical mounting members secured to the one or more horizontal members. At least one of the vertical mounting members has a first linear segment radially offset from a second linear segment by a transition segment to form a radially offset mounting member with an active antenna unit mounted thereto, the active antenna unit includes an antenna and a radio mounted behind the antenna, and at least one of the vertical mounting members has a linear profile with a passive antenna mounted thereto.

Another aspect of the present invention is directed to a mounting pipe assembly. The mounting pipe assembly includes an active antenna unit having an antenna and a radio mounted behind the antenna, and a radially offset mounting pipe. The radially offset mounting pipe has a first linear segment radially offset from a second linear segment by a transition segment and is configured to mirror a rear profile of the active antenna unit. The active antenna unit is mounted to the radially offset mounting pipe via a plurality of mounting brackets.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
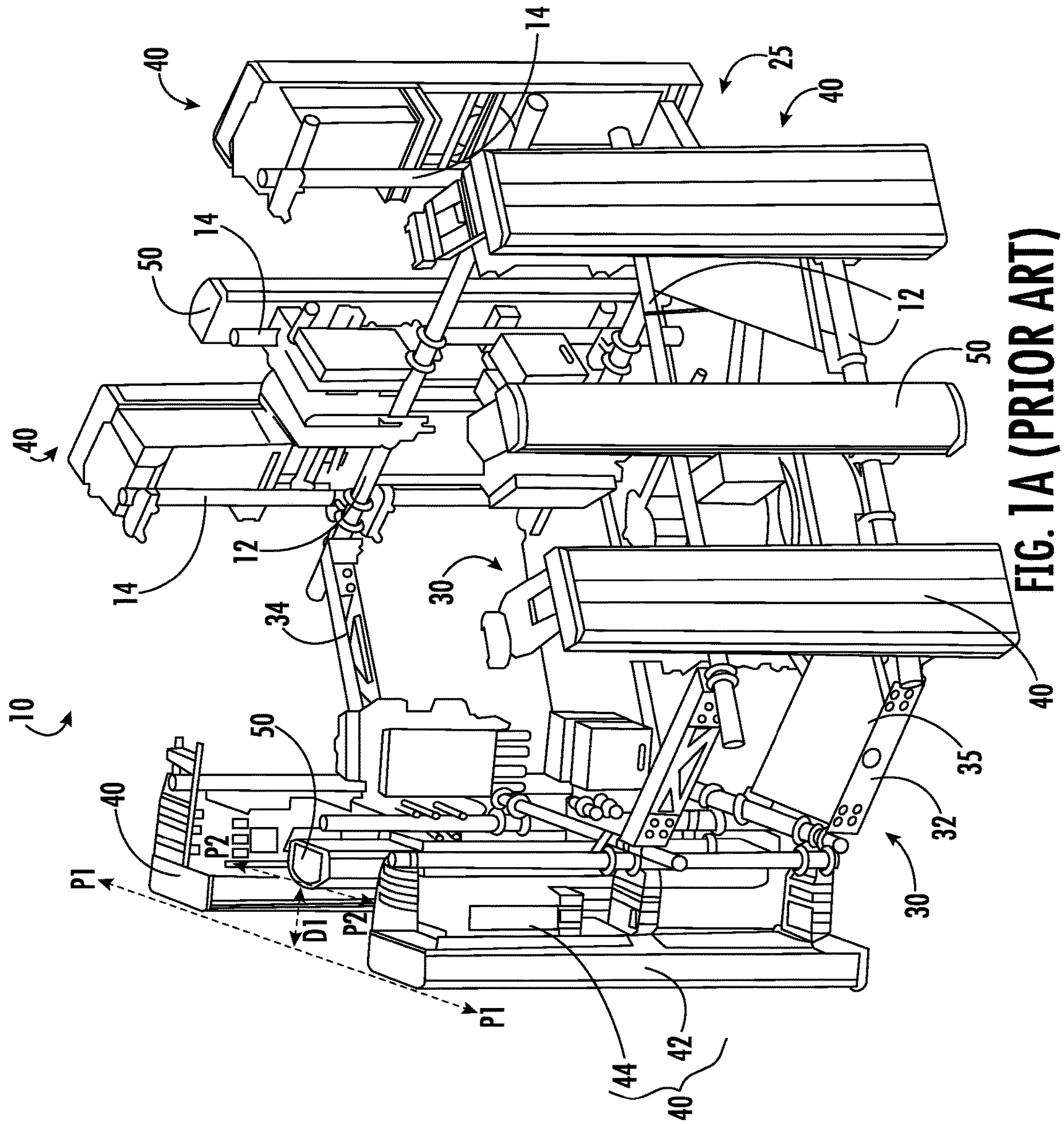
FIG. 1A (PRIOR ART)
FIG. 1A is a top perspective view of a known monopole platform assembly.
Figure 1C:
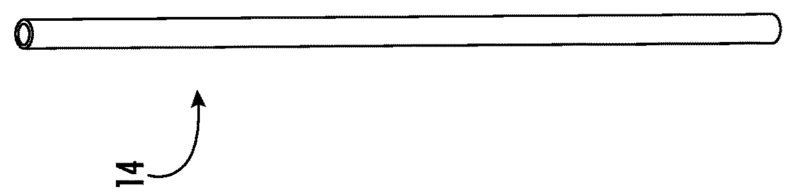
FIG. 1C (PRIOR ART)
FIG. 1C is an exemplary mounting pipe used to mount telecommunications equipment (e.g., active antenna units and passive antennas) to the monopole platform assembly of FIG. 1A.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10"').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, mounting members and related platform assemblies are provided that reduce the distance between active antenna units and passive antennas mounted on a monopole platform assembly, thereby helping to reduce interference among RF signals sent from or received by the respective antennas. The mounting members are also configured to bring the active antenna units into closer proximity with the sector frame of the platform assembly, thereby helping reduce load weight on the platform assembly. Embodiments of the present invention will now be discussed in greater detail with reference to FIGS. 2-6B.

Figure 1B:
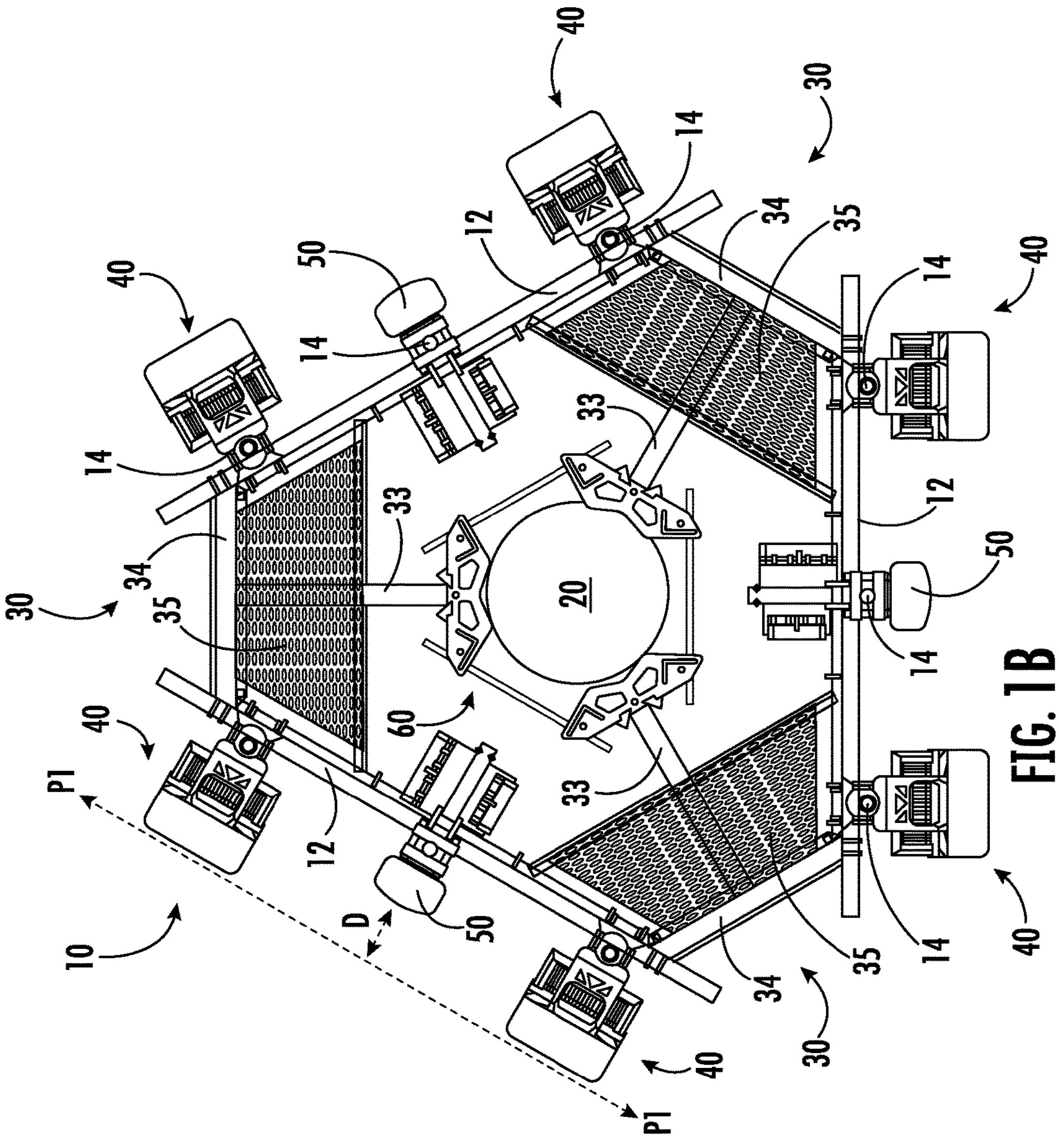
FIG. 1B (PRIOR ART)
FIG. 1B is a top view of the monopole platform assembly of FIG. 1A.
Figure 2A:
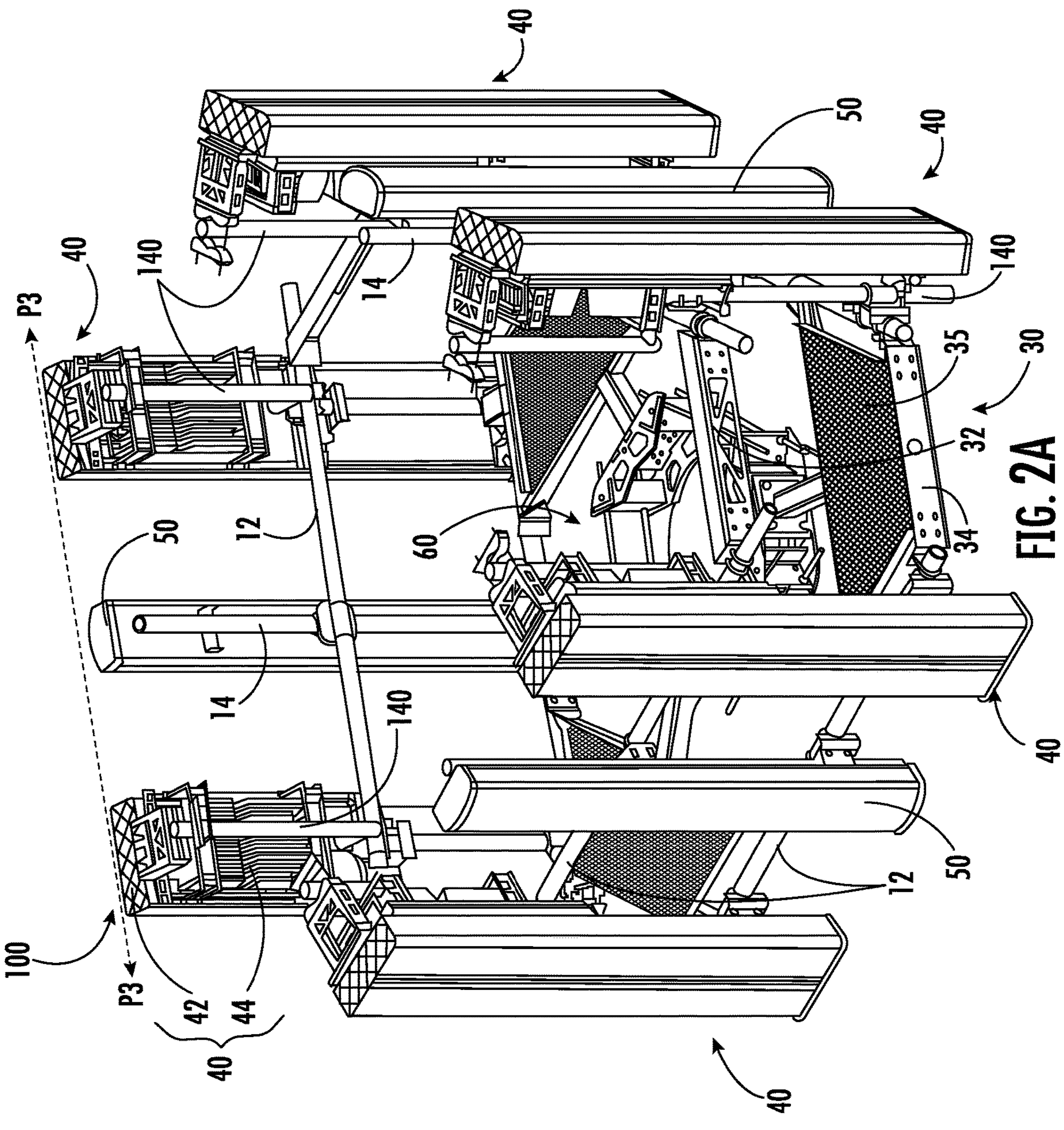
FIG. 2A is a top perspective view of a monopole platform assembly according to embodiments of the present invention.
Figure 2B:
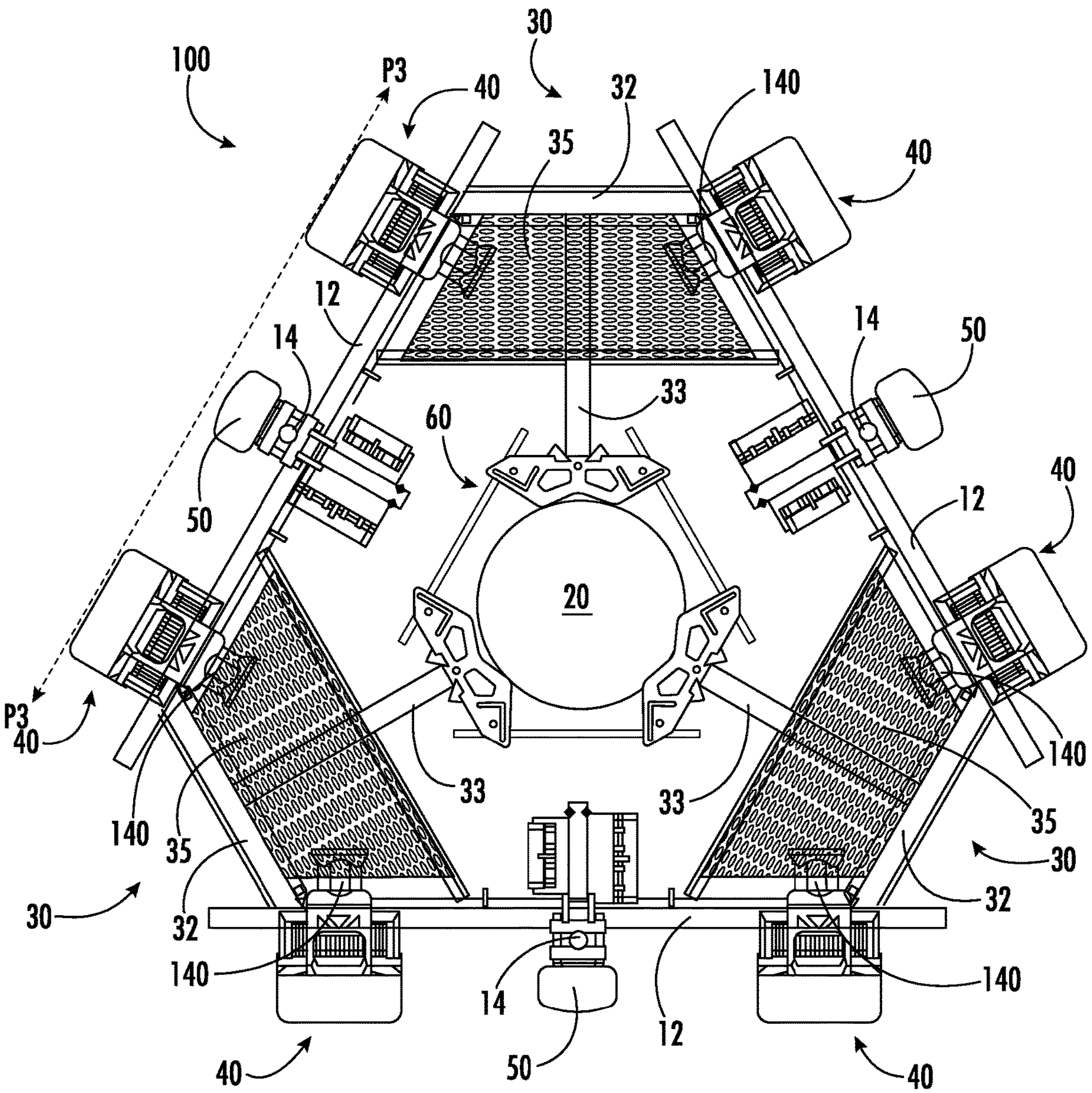
FIG. 2B is a top view of the monopole platform assembly of FIG. 2A.
Figure 2C:
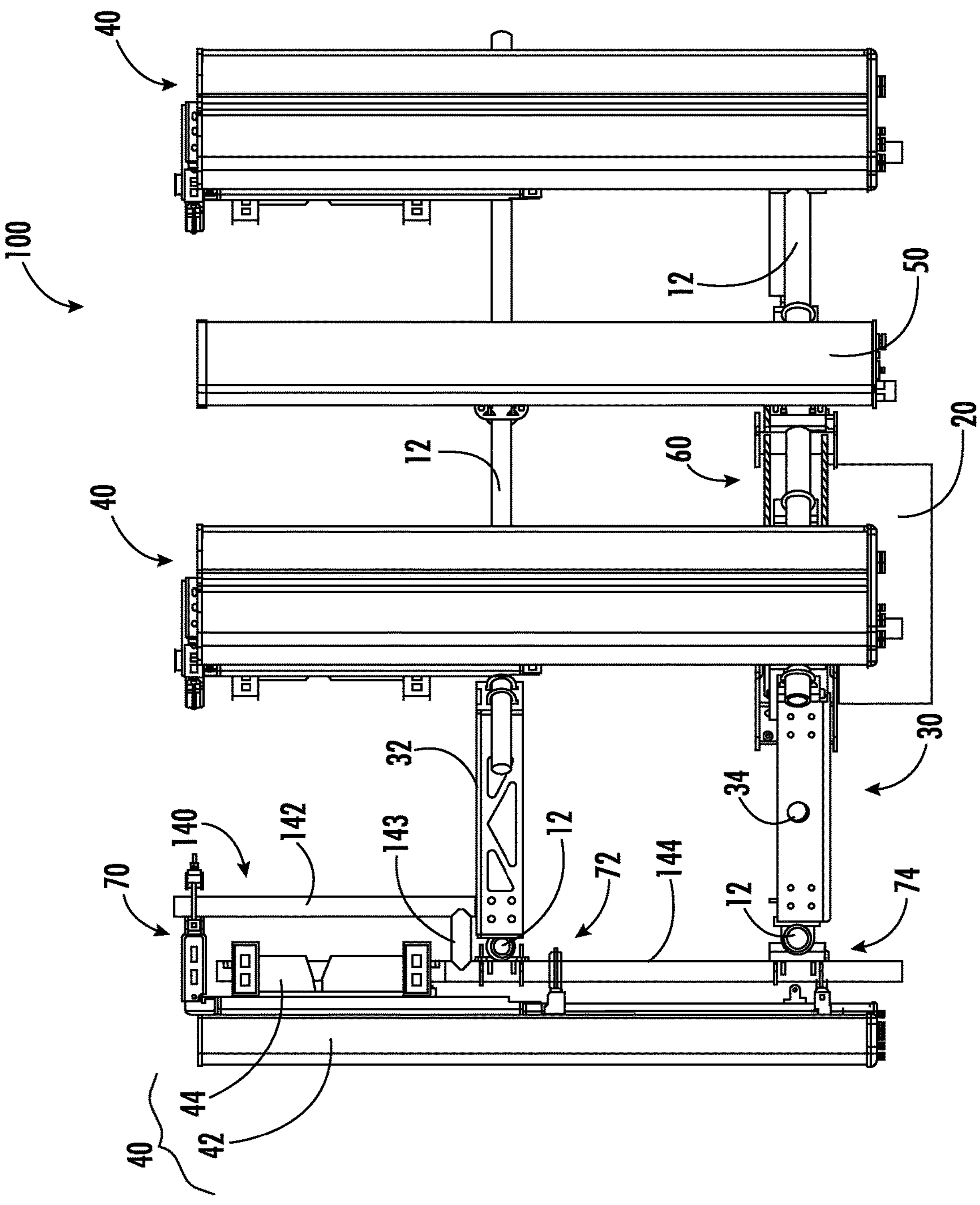
FIG. 2C is a side view of the monopole platform assembly of FIG. 2A.

Referring to FIGS. 2A-2C, a monopole platform assembly 100 according to embodiments of the present invention is illustrated. In many aspects, the monopole platform assembly 100 of the present invention is similar to the platform assembly 10 discussed above and illustrated in FIGS. 1A-1B. Like the platform assembly 10 shown in FIGS. 1A-1B, the monopole platform assembly 100 of the present invention includes a ring mount 60 configured to secure the assembly 100 to a mounting structure 20 (i.e., a monopole) (see, e.g., FIGS. 2B-2C). The platform assembly 100 further includes a plurality of support members 33 coupled to and extending radially outwardly from the ring mount 60. As shown in FIGS. 2A-2B, in some embodiments, the platform assembly 100 includes three support members 33. The platform assembly 100 of the present invention also includes a platform subassembly 30 that is coupled and secured to an opposing end of each support members 33. In some embodiments, each platform subassembly 30 comprises upper and lower auxiliary support members 32, 34 and a grating 35. As shown in FIGS. 2A-2C, adjacent platform subassemblies 30 are coupled together via horizontal members or pipes 12 extending between and secured to respective upper and lower auxiliary support members 32, 34 of the adjacent platform subassemblies 30.

The difference between the platform assembly 10 illustrated in FIGS. 1A-1B and the platform assembly 100 of the present invention is that in the platform assembly 100 of the present invention, the straight or linear mounting pipes 14 that are used to mount the active antenna units 40 to the horizontal members 12 are replaced with radially offset mounting members or pipes 140 (see also, e.g., FIGS. 3A-6B). As used herein, the term "radially offset" means that the mounting member comprises two co-linear segments that are radially offset from each other by a transition member.

As described in further detail below, and as shown in FIGS. 2A-2B, according to embodiments of the present invention, the radially offset mounting members 140 are configured to position the active antenna units 40 (i.e., the front surfaces of the antennas 42 of the active antenna units 40) to reside along a similar plane P3 as the front surface of the passive antennas 50, thereby helping to reduce interference of the RF signals sent from or received by the active antenna units 40 and the passive antennas 50. In addition, the radially offset mounting members 140 of the present invention allow the active antenna units 40 to be mounted closer to the horizontal members 12 (i.e., sector frame) of the platform assembly 100, which helps to reduce load weight on the platform assembly 100.

Figure 3A:
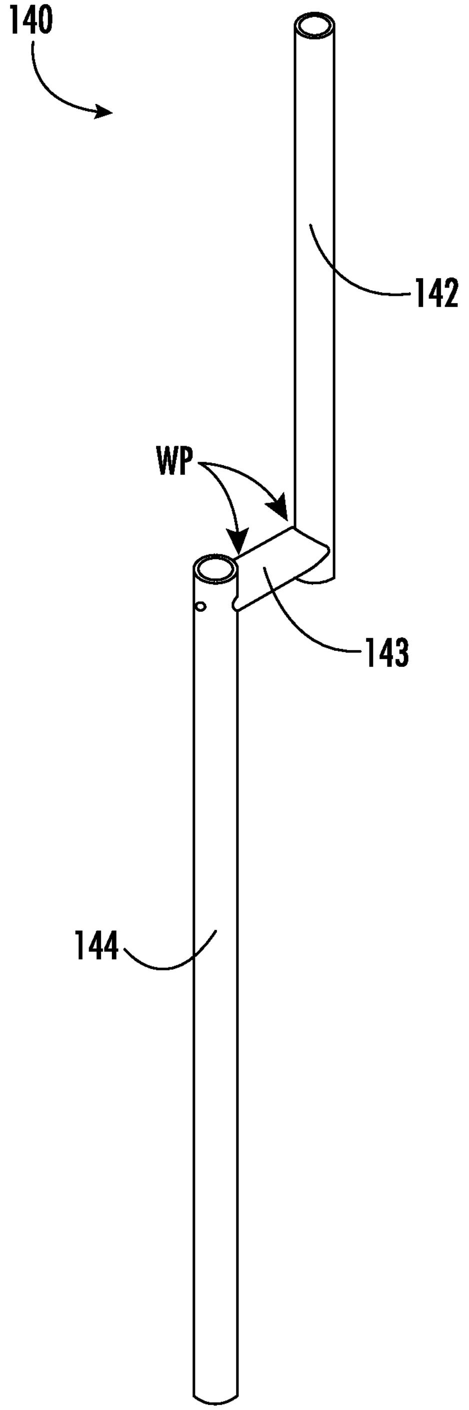
FIGS. 3A-3B are perspective and side views of a radially offset mounting member for an active antenna unit according to embodiments of the present invention.
Figure 3B:
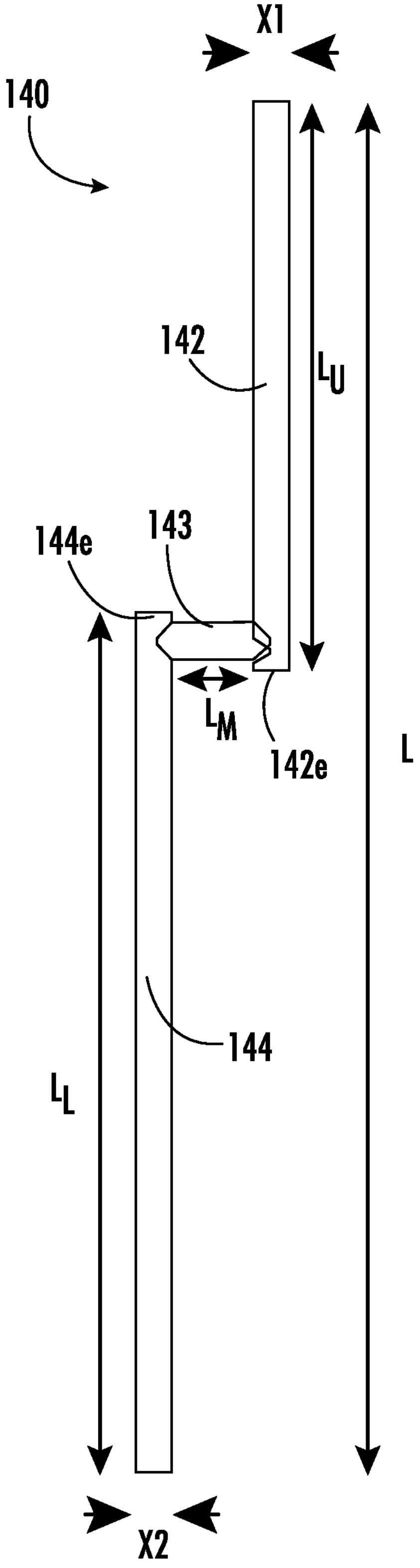

Referring to FIGS. 3A-3B, a mounting member or pipe 140 according to embodiments of the present invention is illustrated. As shown in FIGS. 3A-3B, the mounting member 140 has first and second linear segments 142, 144 that are radially offset by a transition segment 143. In some embodiments, the mounting member 140 may comprise three (3) separate segments that are secured together (e.g., via welding) to form the radially offset the mounting member 140. For example, in some embodiments, the mounting member 140 comprises an upper pipe segment 142 (i.e., first linear segment), a middle pipe segment 143 (i.e., transition segment), and a lower pipe segment 144 (i.e., second linear segment). As shown in FIGS. 3A-3B, in some embodiments, the upper and lower pipe segments 142, 144 may be positioned to extend along axes that are parallel to each other with the middle pipe segment 143 secured to and extending perpendicular therebetween. In some embodiments, the middle pipe segment 143 may be secured to a lower end 142*e* of the upper pipe segment 142 and an upper end 144*e* of the lower pipe segment 144 at weld points WP.

In some embodiments, the upper pipe segment 142 may have a length $L_U$ in a range of between about 40 inches and about 45 inches and a diameter X1 in a range of between about 2 inches and about 4 inches. In some embodiments, the middle pipe segment 143 may have a length $L_M$ in a range of between about 5 inches and about 10 inches. The lower pipe segment 144 may have a length $L_L$ in a range of between about 60 inches and about 65 inches and a diameter X2 in a range of between about 2 inches and about 4 inches. In some embodiments, the diameter X1 of the upper pipe segment 142 is the same as the diameter X2 of the lower pipe segment 144. In some embodiments, the mounting member 140 has an overall length (L) in a range of between about 100 inches and about 110 inches.

Figure 4:
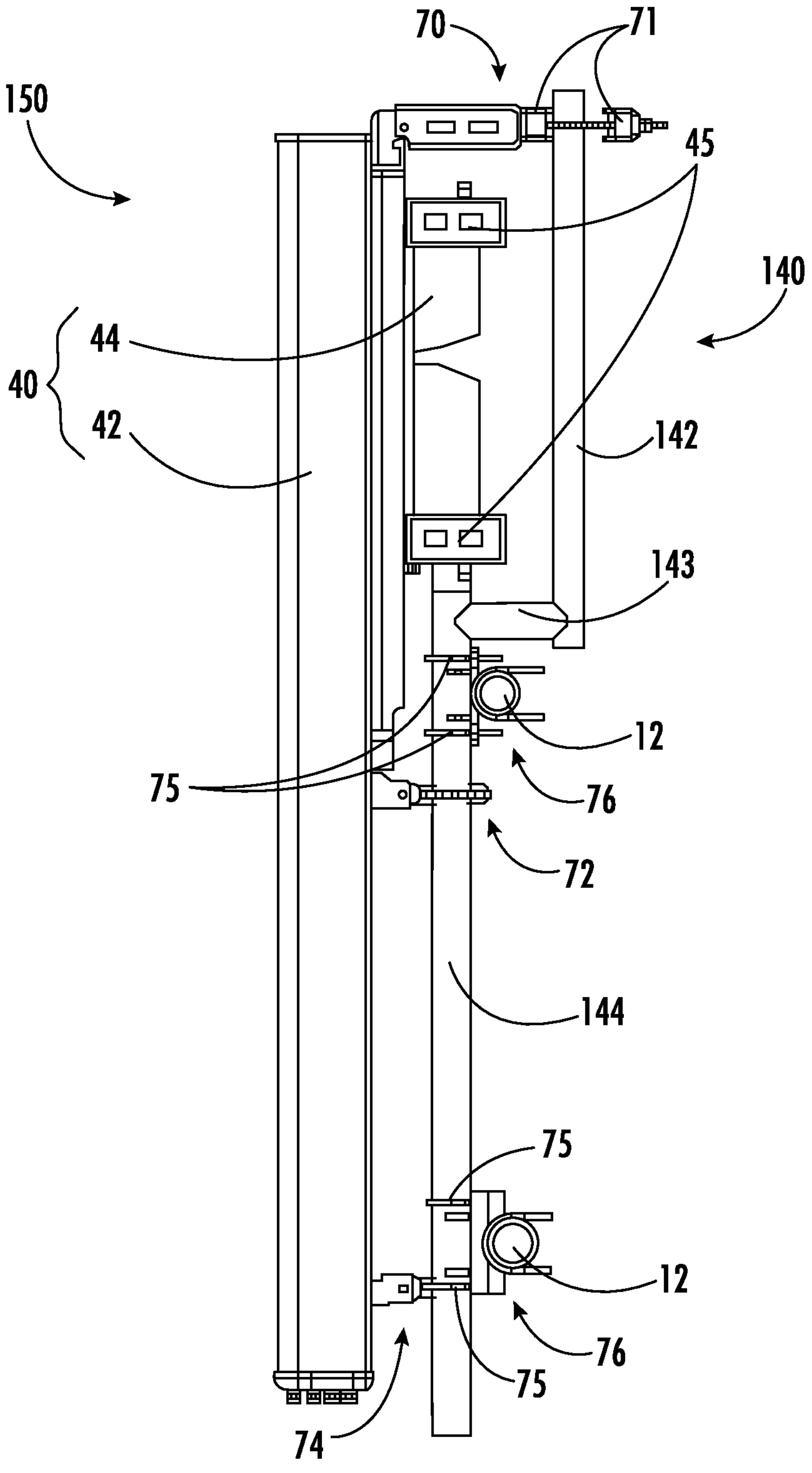
FIG. 4 is a side view illustrating an active antenna unit mounted to the mounting member of FIGS. 3A-3B according to embodiments of the present invention.

FIG. 4 illustrates an assembly 150 in which an active antenna unit 40 with the radio 44 mounted behind the antenna 42 and secured to the mounting member 140 of the present invention. The active antenna unit 40 is secured to the upper pipe segment 142 via an antenna mount 70. In some embodiments, antenna mount 70 comprises standard pipe clamp members 71 configured to engage the upper pipe segment 142 of the mounting member 140 therebetween. The active antenna unit 40 is further secured to the lower pipe segment 144 via middle and lower antenna mounts 72, 74. In some embodiments, the middle and lower antenna mounts 72, 74 may also comprise similar pipe clamp members 71 that are configured to engage the lower pipe segment 144 of the mounting member 140 therebetween. In some embodiments, the active antenna unit 40 may be mounted to the mounting member 140 such that the active antenna unit 40 is configured to pivot relative to the mounting member 140, for example, to adjust the downtilt angle of the active antenna unit 40.

The assembly 150 illustrated in FIG. 4 also shows the mounting member 140 secured to two horizontal members 12 of the platform assembly 100 according to embodiments of the present invention. As shown in FIG. 4, in some embodiments, the lower pipe segment 144 of the mounting member 140 is secured to the horizontal members 12. In some embodiments, the lower pipe segment 144 may be secured to the horizontal members 12 via respective mounting brackets 76 and corresponding fasteners 75 (e.g., U-bolts).

The radially offset profile of the mounting member 140 of the present invention is configured to mirror or follow with the rear profile of the active antenna unit 40. As shown in FIG. 4, the middle pipe segment 143 of the mounting member 140 is positioned such that it extends outwardly from (i.e., perpendicular to) the upper pipe segment 143 below the mounting brackets 45 for the radio 44 of the active antenna unit 40. The configuration of the mounting member 140 of the present invention allows the active antenna unit 40 to be mounted in closer proximity to the mounting member 140, and thus, in closer proximity to the platform assembly 100, thereby helping to reduce the overall load weight of the active antenna units 40 on the platform assembly 100.

Figure 5A:
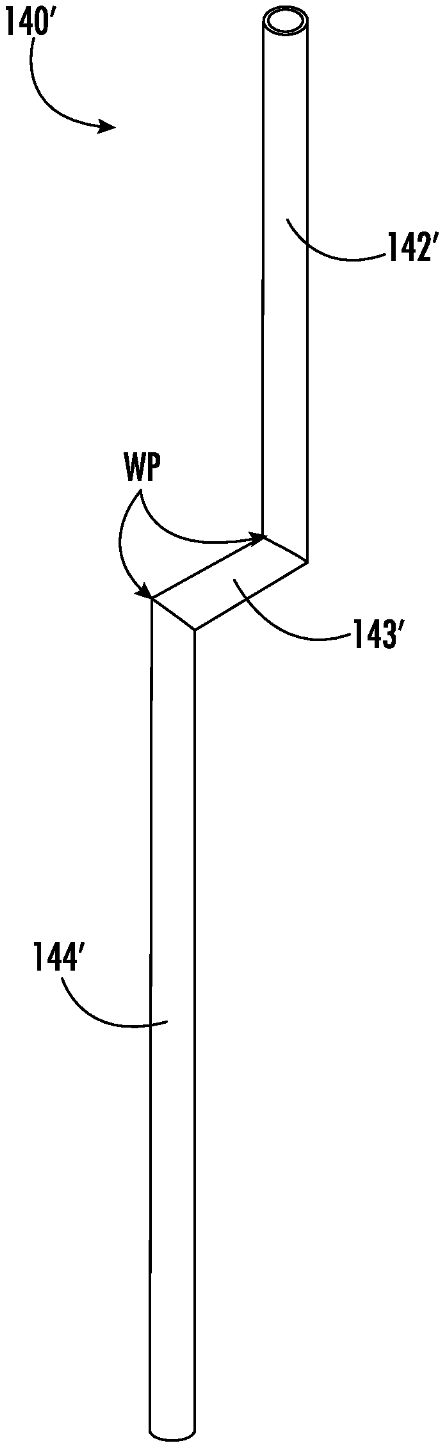
FIGS. 5A-5B are perspective and side views of an alternative configuration for the radially offset mounting member of FIGS. 3A-3B according to embodiments of the present invention.
Figure 5B:
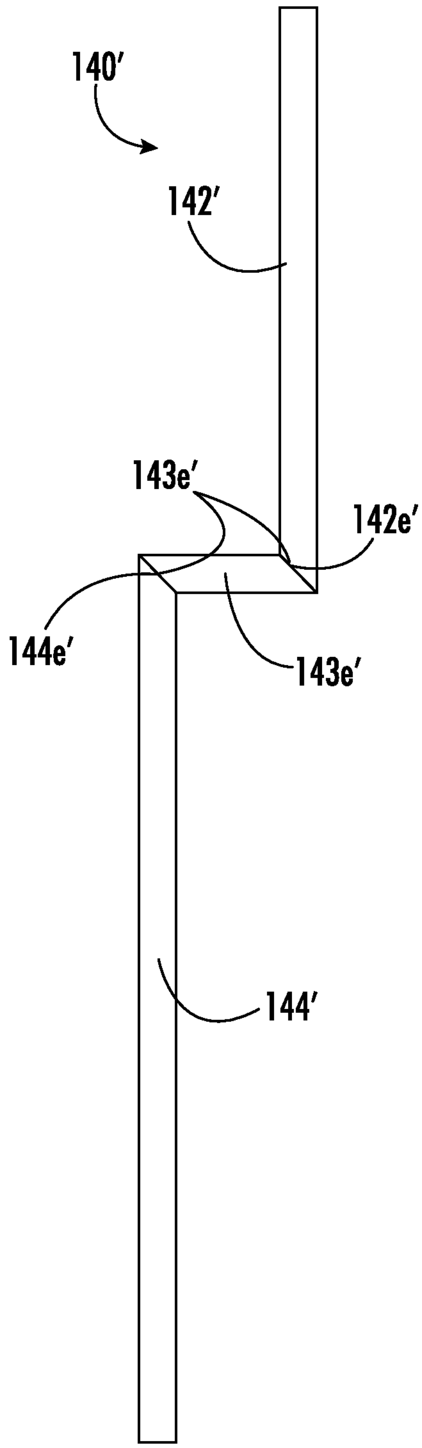

Referring now to FIGS. 5A-5B, an alternative mounting member 140' according to embodiments of the present invention is illustrated. Properties and/or features of the mounting member 140' may be as described above in reference to the mounting member 140 shown in FIGS. 3A-3B and FIG. 4 and duplicate discussion thereof may be omitted herein for the purposes of discussing FIGS. 5A-5B.

As shown in FIGS. 5A-5B, similar to the mounting member 140 described herein, the mounting member 140' has first and second linear segments radially offset by a transition segment formed by upper, middle, and lower pipe segments 142', 143', 144' secured together (e.g., via welding at weld points WP). The difference between the mounting member 140' and the mounting member 140 described herein is that the opposing ends 143*e*' of the middle pipe segment 143', the lower end 142*e*' of the upper pipe segment 142', and the upper end 144*e*' of the lower pipe segment 144' of the mounting member 140' are each approximately cut at a 45 degree angle. This allows the three pipe segments 142', 143', 144' to be fitted and welded together to form approximate right angles (i.e., approximately 90 degrees) (see, e.g., FIG. 5B). The dimensions (i.e., lengths and diameters) for the mounting member 140' and respective pipe segments 142', 143', 144' are similar to those described above with respect to mounting member 140. In addition, the active antenna unit 40 may be secured to the mounting member 140' and the mounting member 140' may be secured to the horizontal member 12 in the similar manners as described herein with respect to mounting member 140.

Figure 6A:
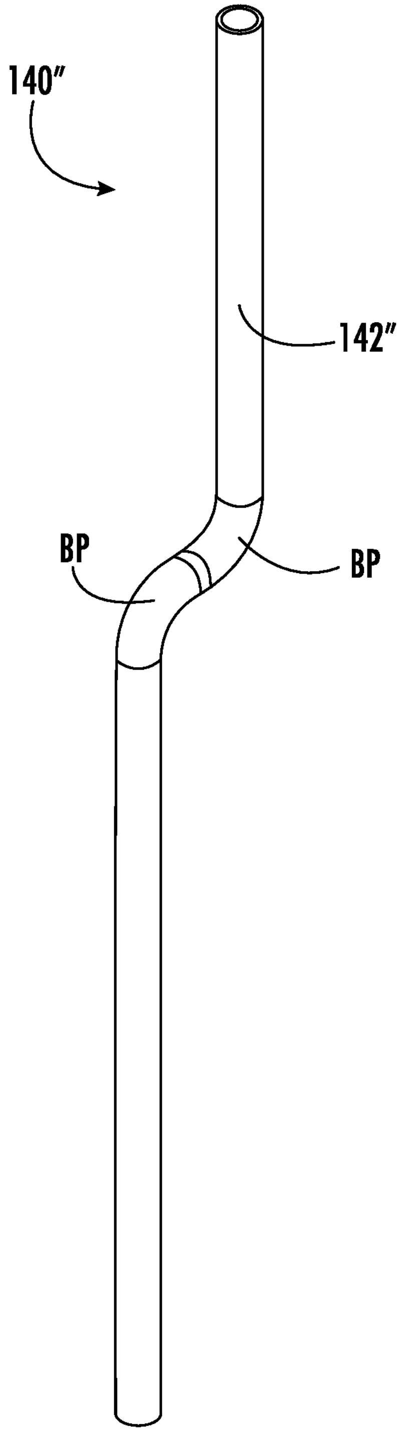
FIGS. 6A-6B are perspective and side view of another alternative configuration for the radially offset mounting member of FIGS. 3A-3B according to embodiments of the present invention.
Figure 6B:
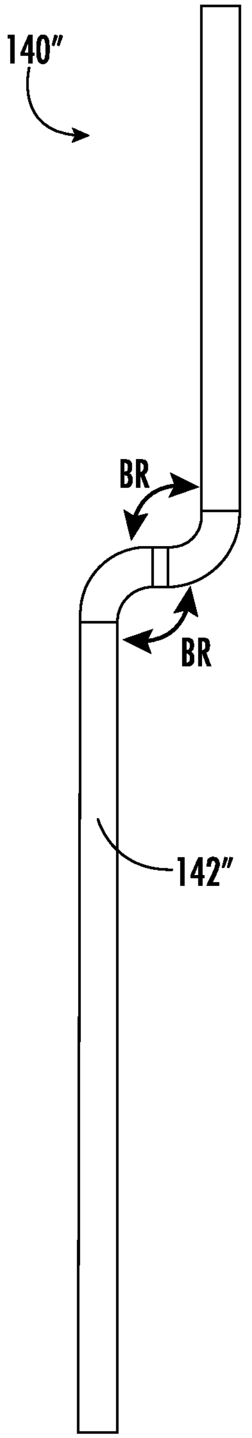

Referring now to FIGS. 6A-6B, an alternative mounting member 140" according to embodiments of the present invention is illustrated. Properties and/or features of the mounting member 140" may be as described above in reference to the mounting members 140, 140' shown in FIGS. 3A-3B, FIG. 4, and FIGS. 5A-5B and duplicate discussion thereof may be omitted herein for the purposes of discussing FIGS. 6A-6B.

As shown in FIGS. 6A-6B, similar to the mounting members 140, 140' described herein, the mounting member 140" has first and second linear segments radially offset by a transition segment. The difference between the mounting member 140" and the mounting members 140, 140' described herein is that the mounting member 140" comprises a single pipe 142" that is bent in two locations along the length of the pipe 142" (i.e., bend points BP) to form the transition segment which radially offsets first and second linear segments. In some embodiments, the bend points BP in the single pipe 142" have a bend radius BR in a range of between about 2 inches and about 6 inches. The overall length and diameter for the mounting member 140" are similar to those described above with respect to mounting member 140. In addition, the active antenna unit 40 may be secured to the mounting member 140" and the mounting member 140" may be secured to the horizontal member 12 in the similar manners as described herein with respect to mounting members 140, 140'.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A monopole platform assembly, the platform assembly comprising:

a ring mount configured to be secured to a monopole;

a plurality of platform subassemblies, each platform subassembly coupled to the ring mount via a support member and comprising upper and lower auxiliary support members and a grating, wherein adjacent platform subassemblies are coupled together via horizontal members extending between and secured to respective upper and lower auxiliary support members; and a plurality of vertical mounting members, each vertical mounting member configured to be mounted to at least one of the horizontal members, with one or more of the vertical mounting members having a first linear segment radially offset from a second linear segment by a transition segment to form a radially offset mounting member and one or more of the vertical mounting members having a linear profile, wherein each radially offset mounting member is configured to have an active antenna unit mounted thereto, the active antenna unit comprising an antenna and a radio mounted behind the antenna, and wherein each vertical mounting member having the linear profile is configured to have a passive antenna mounted thereto.

2. The platform assembly according to claim 1, wherein the plurality of vertical mounting members comprises three mounting members secured to at least one horizontal member, wherein two of the three mounting members are radially offset mounting members with an active antenna unit mounted thereto and the third mounting member has a linear profile with a passive antenna mounted thereto.

3. The platform assembly according to claim 2, wherein the active antenna units and the passive antenna are positioned such that front surfaces of the antenna of the active antenna unit and the passive antenna reside substantially along the same plane.

4. The platform assembly according to claim 1, wherein the one or more radially offset mounting members is configured to mirror a rear profile of the active antenna units.

5. The platform assembly according to claim 1, wherein the radially offset mounting members comprise an upper pipe segment, a middle pipe segment, and a lower pipe segment.

6. The platform assembly according to claim 5, wherein the upper pipe segment and the lower pipe segment are positioned to extend along axes that are parallel to each other with the middle pipe segment being secured to and extending perpendicularly between the upper and lower pipe segments.

7. The platform assembly according to claim 5, wherein the middle pipe segment is secured to a lower end of the upper pipe segment and an upper end of the lower pipe segment.

8. The platform assembly according to claim 5, wherein opposing ends of the middle pipe segment, a lower end of the upper pipe segment, and an upper end of the lower pipe segment are each cut at a 45-degree angle and secured together to form 90-degree angles between the middle pipe segment and the upper and lower pipe segments, respectively.

9. The platform assembly according to claim 1, wherein the radially offset mounting members comprise a single pipe that is bent at two bend points along a length of the pipe to radially offset the first linear segment from the second linear segment.

10. A monopole platform assembly, the platform assembly comprising:

a monopole;

a ring mount secured to the monopole;

three platform subassemblies, each platform subassembly coupled to the ring mount via a support member, wherein adjacent platform subassemblies are coupled together via one or more horizontal members extending therebetween; and a plurality of vertical mounting members secured to the one or more horizontal members, wherein at least one of the vertical mounting members has a first linear segment radially offset from a second linear segment by a transition segment to form a radially offset mounting member with an active antenna unit mounted thereto, the active antenna unit comprising an antenna and a radio mounted behind the antenna, and wherein at least one of the vertical mounting members has a linear profile with a passive antenna mounted thereto.

11. The platform assembly according to claim 10, wherein the platform assembly comprises three vertical mounting members secured to one of the one or more horizontal members, wherein two of the three vertical mounting members are radially offset mounting members with an active antenna unit mounted thereto and one of the three vertical mounting members has the linear profile with a passive antenna mounted thereto, and wherein the active antenna units and the passive antenna are positioned such that the front surfaces of the antennas of the active antenna units and the passive antenna reside substantially along the same plane.

12. The platform assembly according to claim 10, wherein the radially offset mounting members are configured to mirror a rear profile of the active antenna units.

13. The platform assembly according to claim 10, wherein the radially offset mounting members comprise an upper pipe segment, a middle pipe segment, and a lower pipe segment.

14. A mounting pipe assembly, the mounting pipe assembly comprising:

an active antenna unit comprising an antenna and a radio mounted behind the antenna; and a radially offset mounting pipe, the mounting pipe having a first linear segment radially offset from a second linear segment by a transition segment and is configured to mirror a rear profile of the active antenna units, wherein the active antenna unit is mounted to the radially offset mounting pipe via a plurality of mounting brackets.

15. The mounting pipe assembly according to claim 14, wherein the radially offset mounting pipe is secured to at least one horizontal member of a platform assembly.

16. The mounting pipe assembly according to claim 14, wherein the radially offset mounting member pipe comprises an upper pipe segment, a middle pipe segment, and a lower pipe segment.

17. The mounting pipe assembly according to claim 14, wherein the upper pipe segment and the lower pipe segment are positioned to extend along axes that are parallel to each other with the middle pipe segment being secured to and extending perpendicularly between the upper and lower pipe segments.

18. The mounting pipe assembly according to claim 14, wherein the middle pipe segment is secured to a lower end of the upper pipe segment and an upper end of the lower pipe segment.

19. The mounting pipe assembly according to claim 14, wherein opposing ends of the middle pipe segment, a lower end of the upper pipe segment, and an upper end of the lower pipe segment are each cut at a 45-degree angle and secured together to form 90-degree angles between the middle pipe segment and the upper and lower pipe segments, respectively.

20. The mounting pipe assembly according to claim 14, wherein the mounting pipe is bent at two bend points along a length of the pipe to radially offset the first linear segment from the second linear segment.

* * * * *